United States Patent
Wiser, III et al.

(10) Patent No.: US 6,574,123 B2
(45) Date of Patent: Jun. 3, 2003

(54) POWER SUPPLY FOR ELECTROSTATIC AIR FILTRATION

(75) Inventors: Forwood Cloud Wiser, III, Kingston, NJ (US); George Robert Summers, Carleton Place (CA)

(73) Assignee: Engineering Dynamics LTD, Ontario (CA)

( * ) Notice: Subject to any disclaimer, the term of this patent is extended or adjusted under 35 U.S.C. 154(b) by 153 days.

(21) Appl. No.: 09/904,029

(22) Filed: Jul. 12, 2001

(65) Prior Publication Data

US 2003/0012039 A1 Jan. 16, 2003

(51) Int. Cl.[7] ............................................. H02M 7/10
(52) U.S. Cl. ................................... 363/50; 363/37
(58) Field of Search ................................ 363/37, 39, 40, 363/44, 50, 52, 55, 56.05, 56.11, 80, 89

(56) References Cited

U.S. PATENT DOCUMENTS

| | | | | |
|---|---|---|---|---|
| 4,779,182 A | | 10/1988 | Mickal et al. ................ 363/37 |
| 4,936,876 A | | 6/1990 | Reyes .............................. 55/2 |
| 5,124,518 A | * | 6/1992 | Lee .............................. 363/98 |
| 5,173,849 A | * | 12/1992 | Brooks ..................... 363/80 X |
| 5,471,377 A | | 11/1995 | Donig et al. .................. 363/21 |
| 5,920,474 A | | 7/1999 | Johnson et al. ............. 363/126 |

FOREIGN PATENT DOCUMENTS

CA     1 272 453     8/1990

* cited by examiner

*Primary Examiner*—Jessica Han
(74) *Attorney, Agent, or Firm*—J Herbert O'Toole; Nexsen Pruet Jacobs & Pollard, LLC

(57) ABSTRACT

A power supply for an electrostatic air filtration unit includes an input stage, an isolation stage and an output stage. The isolation stage electrically isolates the output stage from the input stage. The output stage includes an output amplifier driven through the isolation stage by the oscillator. The output stage further includes a voltage regulator to inhibit the output voltage from exceeding a predetermined maximum voltage. The output of the power supply is insensitive to over-voltage swings in the input power to inhibit spark-over induced damage to the power supply. The power supply is encased in a resin to extend the operational life of the power supply by inhibiting tampering and intrusion of water, and enhancing resistance to corrosion and microbial damage.

20 Claims, 3 Drawing Sheets

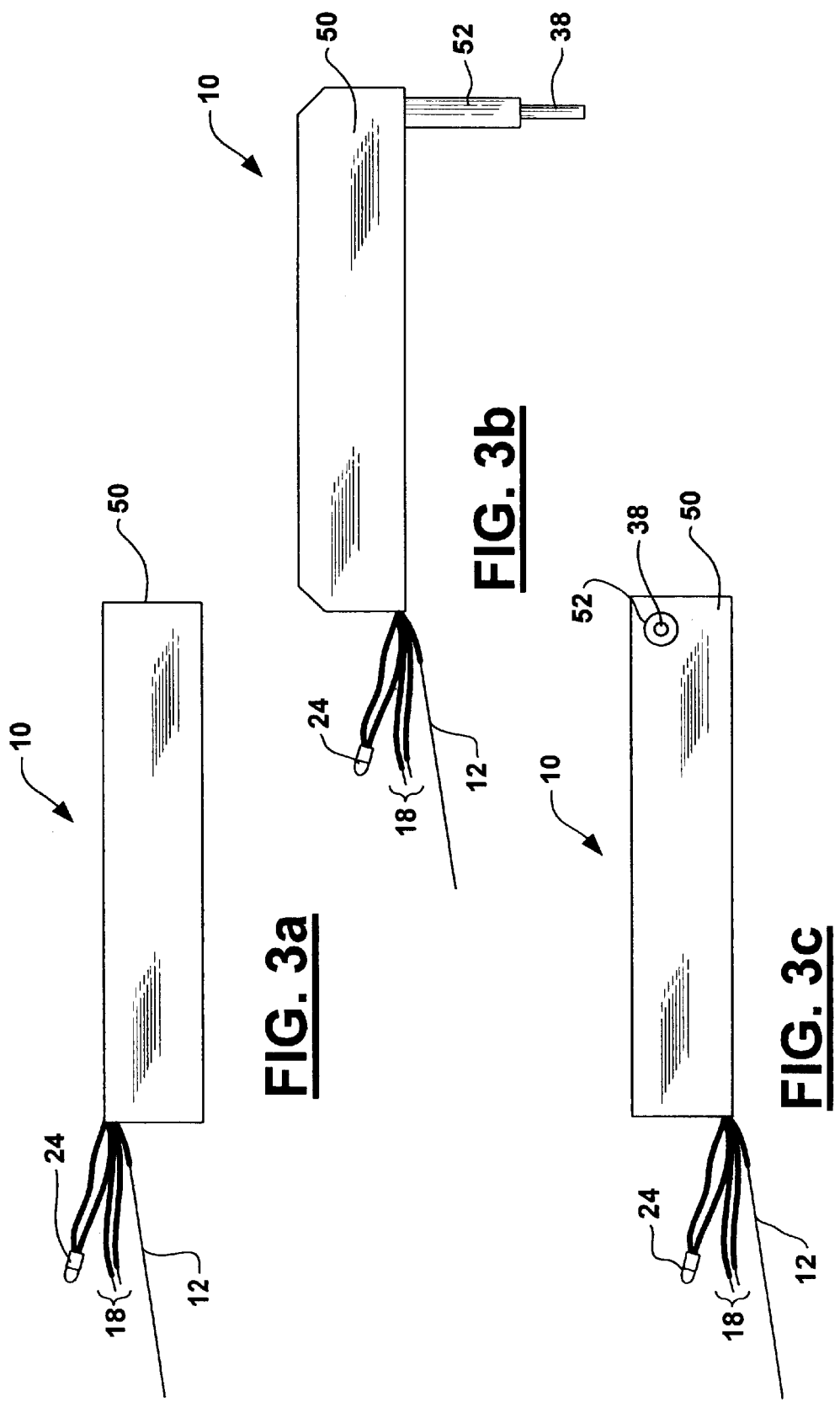

POWER SUPPLY FOR ELECTROSTATIC AIR FILTRATION

CROSS-REFERENCE TO RELATED APPLICATIONS

This is the first application filed for the present invention.

MICROFICHE APPENDIX

Not Applicable.

TECHNICAL FIELD

The invention relates in general to fluid filtration systems and, in particular, to a power supply for extending the service life of an electrostatic air filtration system.

BACKGROUND OF THE INVENTION

Electrostatic air filtration systems can be generally categorized into one of two types: precipitators, and charged-media type air filters. In precipitators, corona wires ionize air contaminants, and the ionized contaminants precipitate onto oppositely charged collector plates. High voltages are used to ionize the airborne contaminants in order to enhance precipitation of the contaminants. The precipitation of ionized contaminants occurs due to Coulomb forces induced by electrostatic fields surrounding the corona wires, which produce voltage gradients. Air filtration efficiency is increased by steep voltage gradients. Steep voltage gradients can be achieved by increasing a voltage applied between the corona wires and the collector plates of an air filtration unit. Ionization of air contaminants is effected largely by dissociating electrons from air contaminating molecules or air contaminating particles. Once dissociated, the ionized contaminants travel towards the collector plates and the dissociated electrons travel towards the corona wires.

There is a degree of ease with which air contaminants ionize. As air itself can be ionized, precipitator air filtration systems are adapted to precipitate air contaminants which ionize easier than air. The ionization is also affected by conditions such as ambient temperature, relative humidity, air pressure, etc. At very steep voltage gradients, air itself ionizes. As opposed to contaminant ionization, there is a plentiful supply of air available. Therefore, on ionizing air, a continuous path of ions travelling towards the corona wires is formed. The ionized path is localized and provides an electrical discharge path between the high voltage corona wires and the grounded collector plates, temporarily destroying the electrostatic field therebetween. The contaminant ionization efficiency is reduced, therefore reducing the filtration action of the apparatus. The ionized discharge path can be observed as a spark and therefore referred to in the art as a "spark-over".

High voltage spark-overs provide a path for large load currents to flow between the high voltage corona wires and the grounded collector plates, and is equivalent to a short circuit. Typically the high voltage electronics of the high voltage power supply are designed to apply high voltages to the high voltage corona wires using load currents that can sustain only low rates of discharge. Operating the high voltage electronics at high load currents can produce excessive heating and therefore component wear at an accelerated rate. Spark-overs also destroy metal surface treatments used in manufacturing the electrostatic filter electrodes, reducing their ability to withstand high humidity, microbial damage, and other corrosives.

Several power supplies have been invented for precipitator-type electrostatic air filtration systems.

For example, U.S. Pat. No. 4,936,876 entitled "METHOD AND APPARATUS FOR DETECTING BACK CORONA IN AN ELECTROSTATIC FILTER WITH ORDINARY OR INTERMITTENT DC-VOLTAGE SUPPLY", which issued Jun. 26, 1990 to Reyes describes an electrostatic precipitator for cleansing flue gases from industrial plants. The apparatus is designed to detect back corona discharges in a dust layer precipitated on contaminant collecting electrodes. The apparatus makes periodic upward adjustment of the output voltage until spark-overs occur. Based on the setting at which the spark-over occurs the apparatus is adjusted to provide optimal contaminant precipitation for a period of time.

U.S. Pat. No. 5,471,377, entitled "PROCESS FOR CONTROLLING A POWER SUPPLY WHICH SUPPLIES POWER TO AN ELECTROSTATIC FILTER IN WHICH SECONDARY CIRCUIT STATES ARE DETERMINED BASED ON MEASURED PRIMARY CIRCUIT VALUES AND IN WHICH SHORT CIRCUITS ARE DETECTED", which issued Nov. 28, 1995 to Donig et al., describes a method of monitoring a voltage on a primary coil of a high-voltage transformer for voltage drops signifying short circuits at the output. The apparatus counts short circuit occurrences over time and shuts off the power supply on detecting an excessive number of short circuit occurrences.

U.S. Pat. No. 5,920,474 entitled "POWER SUPPLY FOR ELECTROSTATIC DEVICES" issued Jul. 6, 1999 to Johnson et al., describes a method of providing a substantially ripple-free DC power for improved operation of an electrostatic filter.

Three-phase AC power is amplified and rectified to provide the DC output. The input voltage is assumed to be stable, and there is no provision for controlling spark-overs due to over-voltages in the input power.

U.S. Pat. No. 4,779,182 entitled "POWER SUPPLY FOR AN ELECTROSTATIC FILTER" issued Oct. 18, 1988 to Mickal et al., describes a power supply adapted to decouple an output stage from an input stage on detecting short circuits by monitoring a feedback signal representative of the output voltage. The stress put on the power supply circuitry by high current flows generated by short circuits is therefore reduced.

Electrostatic air filters of the charged-media type remove contaminants form air using polarized dielectric fibrous filter pads sandwiched between a highly charged positive electrode and a grounded electrode. The electrodes are typically wire mesh or screen, though other materials are sometimes used. A strong electric field created between the positive and grounded electrodes polarizes the dielectric filter medium, so that positive and negative poles appear on the surface of each fiber. The electric poles attract particulate matter from air passed through the filter. The efficiency of the filter is thus dramatically enhanced.

In general, charged-media type air filters are used in less harsh environments than precipitators. The demands on the power supply are therefore somewhat less demanding but the power supplies for charged-media type air filters are subject to the same stresses as those for precipitator-type filters. Power supplies for charged-media type air filters are typically similar to a power supply described in Canadian Patent No. 1,272,453 which issued to Joannou on Aug. 7, 1990. That power supply includes an electronic oscillator that drives a transformer. The transformer outputs about one tenth of the desired output voltage. A voltage multiplier section boosts the output voltage to the 5–10 Kv. range required to drive the filter. The three sections are mounted on a printed circuit board.

The existing power supplies for electrostatic air filters of the charged-media type have many disadvantages. They do not isolate the input power from the output, so the input power must be isolated or grounded, which is difficult to ensure. Furthermore, they typically step up the output voltage in direct proportion to the input power. Consequently, if the input power is unstable or the input voltage is higher than specification, the output voltage may be too high which can cause arching or shorting in the filter. A further problem is associated with the construction of the power supply, which makes it vulnerable to corrosion, dust contamination and even tampering.

There therefore exists a need for a more reliable power supply for electrostatic air filtration systems. In particular, there exists a need for a power supply for an electrostatic air filter of the charged-media type that overcomes the above-noted problems of power isolation, output regulation and power supply construction.

SUMMARY OF THE INVENTION

It is an object of the invention to extend the service life of electrostatic air filtration systems by providing a more reliable power supply.

In accordance with one aspect of the invention, a power supply for an electrostatic air filtration unit is provided. The power supply includes an input stage, an isolation stage and an output stage. The input stage includes an oscillator driven by input power and provides an oscillator output voltage. The isolation stage electrically isolates the output stage from the input stage. The output stage includes an output amplifier driven through the isolation stage by the oscillator. The output amplifier provides an output voltage on an output electrode. The output stage further includes a voltage regulator for preventing the output voltage from exceeding a predetermined maximum voltage. By limiting the output voltage to a maximum voltage, the output of the power supply is rendered insensitive to over-voltage fluctuations in the input power, thereby inhibiting arching.

In accordance with another aspect of the invention, the power supply is encased in a resin to extend the operational life of the power supply by providing resistance to tampering, and dramatically improving resistance to environmental damage caused by water infiltration, corrosion and microbial attack.

The advantages include a dramatically improved resistance to high humidity and corrosion. The electrical isolation of the output stage from the input stage permits the power supply to be connected to an ungrounded power source. A clamped high voltage output provides spark-over suppression, and tamper-proof, waterproof encasement extends the service life of the air filtration apparatus.

BRIEF DESCRIPTION OF THE DRAWINGS

Further features and advantages of the present invention will become apparent from the following detailed description, taken in combination with the appended drawings, in which:

FIGS. 3a–c are respectively a top plan, side elevational and bottom plan view of an embodiment of the high voltage power supply.

It will be noted that throughout the appended drawings, like features are identified by like reference numerals.

DETAILED DESCRIPTION OF THE PREFERRED EMBODIMENT

Figure 1:
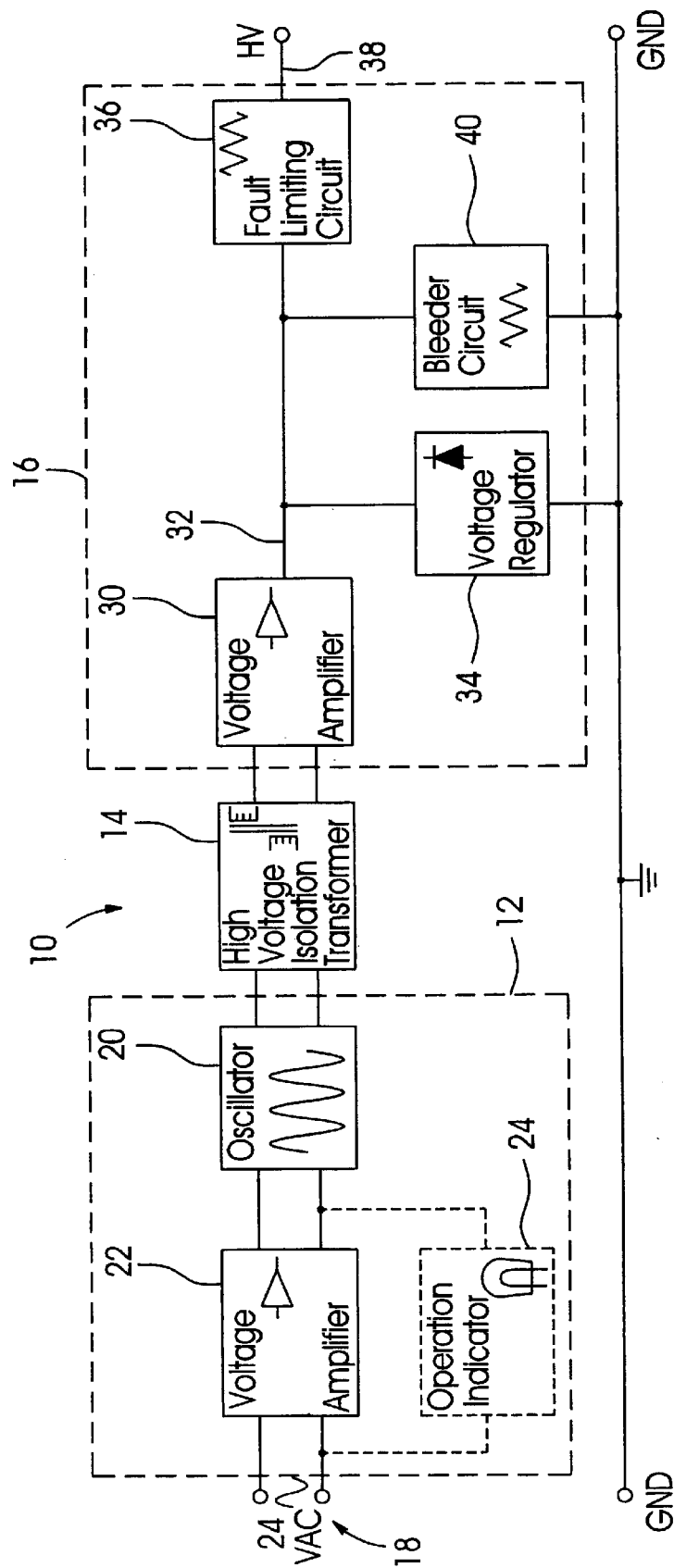
FIG. 1 is a schematic diagram showing functional components of a high voltage power supply for an electrostatic air filter in accordance with the invention.

FIG. 1 is a schematic diagram showing functional components of a high voltage power supply 10 for an electrostatic air filter in accordance with an embodiment of the invention. The high voltage power supply 10 includes an input stage 12, an isolation stage 14 and an output stage 16. The isolation of the output stage 16 from the input stage 12 enables independent optimization of the output stage 16 and the input stage 14. The isolation also permits the power supply 10 to be connected to an ungrounded or non-isolated power source.

The input stage 12 includes an oscillator 20 driven by input power 18. The oscillator 20 outputs a driving oscillator voltage at its output. The high voltage power supply 10 is shown in the diagram to be driven by input power 18 at 24 VAC (alternating current). As will be understood by persons of ordinary skill in the art, the 24 VAC input power is exemplary only, and other sources of input power may be used, such as but not limited to, 110 VAC, 220 VAC. The input power 18 may by amplified by an input amplifier 22 before being output to the oscillator 20. The input amplifier 22 amplifies the voltage of the input power by a predetermined input voltage amplification factor. As will be understood by those skilled in the art, the choice of input power is not limited to alternating current; the oscillator 20 can be constructed to accommodate direct current input power. The input stage 12 may further include an operational indicator 24 to provide a visual indication that the high voltage power supply 10 is receiving input power.

The output stage 16 includes a voltage amplifier 30. The voltage amplifier 30 is driven by the oscillator 20 through the isolation stage 14 and outputs a high voltage output 32. In accordance with this embodiment of the invention, the output stage 16 further includes a voltage regulator 34. The voltage regulator 34 enforces an upper limit on the output voltage 38 of the power supply 10. In accordance with the preferred embodiment of the invention, the output stage 16 also includes a fault limiting circuit 36. The fault limiting circuit 36 enforces an upper limit on the output current of the power supply 10. During normal operation the fault limiting circuit 36 permits a predefined current to be output on the high voltage output 38. If a fault occurs, such as: shorting the output of the high voltage power supply 10 to ground, a spark-over, arching through a damp or soiled filter pad, etc. the fault limiting circuit 36 limits the current passing therethrough to prevent damage to internal components of the power supply 10 and/or limit damage to an object shorting the output of the power supply 10.

The output stage 16 may also include a bleeder circuit 40. The bleeder circuit 40 provides a discharge path for charge built up on the filter electrodes during periods when the power supply 10 is switched off. During normal operation of the power supply 10, the bleeder circuit 38 preferably has a minimal affect on the output of the power supply 10.

In accordance with this embodiment of the invention, the high voltage power supply 10 is encased in a resin to provide resistance to tampering, humidity, water intrusion, corrosion, microbial damage and the accumulation of dust particles on high voltage components. Encasement in Epoxy™ resin is preferred, as it provides a cost effective, humidity resistant, water resistant, corrosion resistant encasement. The encasing material completely encapsulates the power supply 10. The use of the fault limiting circuit 36 prevents high current induced heating of the power supply components eliminating the need for ventilation. Persons skilled in the art will understand that other encasement materials can be used, such as a sealed metallic case or the like.

In accordance with a preferred embodiment of the invention, the high-voltage output electrode is Titanium, which is very resistant to corrosion and erosion induced by humidity, air pollution and arching.

Figure 2:
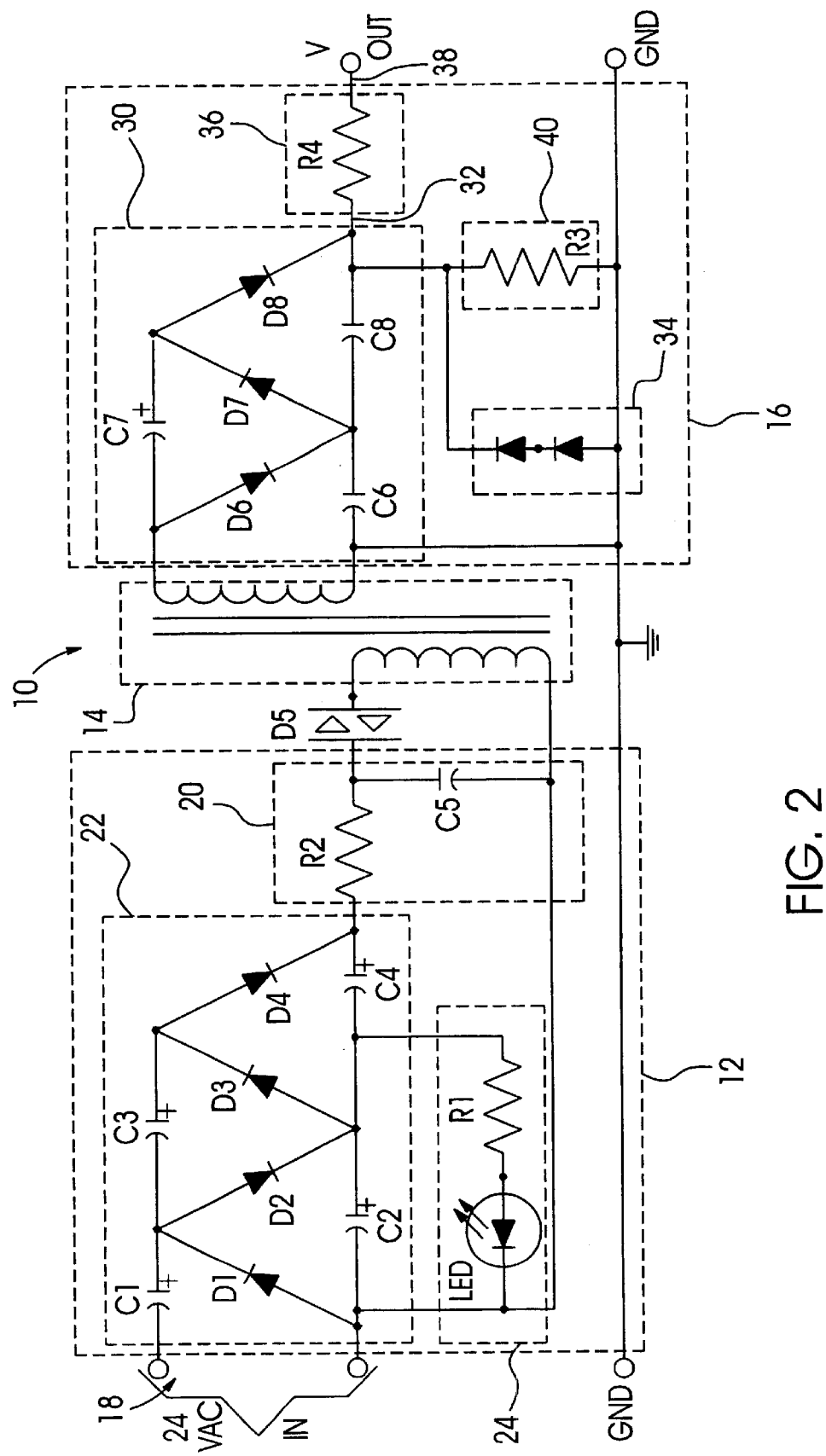
FIG. 2 is a schematic diagram showing an exemplary implementation of a high voltage power supply for an electrostatic air filter in accordance with the invention.

FIG. 2 is a schematic diagram showing an exemplary implementation of a high voltage power supply for an electrostatic air filter in accordance with the preferred embodiment of the invention. The high voltage power supply components shown in FIG. 1 are also shown in dotted lines in FIG. 2.

In accordance with an embodiment of the invention, the input amplifier 22 includes capacitors C1, C2, C3, C4 and diode rectifiers D1, D2, D3, D4 connected in a capacitance ladder arrangement. The particular choice of the implementation of the input amplifier 22 is based on the alternating property of the input power 18. The extent of amplification of the input alternating voltage 18 is dependent on the number of capacitors and diode rectifier pairs in the ladder. The stability of the amplified voltage is dependent on the stability of the input alternating voltage 18, the stability of the amplitude of the input alternating voltage 18 eg. 24 VAC, the alternating frequency of the input alternating voltage 18 and the amount of charge that can be stored by each capacitor in the ladder.

The oscillator 20 is driven by the amplified voltage output by the input amplifier 22 and includes resistor R2 and capacitor C5. A person skilled in the art will understand that the invention is not limited to this exemplary RC oscillator, but the RC oscillator performs well because of the alternating property of the input power 18.

The operation indicator 24 is implemented using resistor R1 and a Light Emitting Diode (LED). The operation indicator may also include sensing components for monitoring and indicating a present state of operation of the high voltage power supply 10, including operational parameters relevant to electrostatic air filtration such as: power drawn, output voltage, cumulative operational time, etc. The operation indicator 24 indicates that input power is being supplied to the power supply 10.

The isolation stage 14 is implemented using an isolation transformer, although other combinations of electrical elements known in the art can provide the isolation function. The isolation transformer provides a cost effective solution. In accordance with an embodiment of the invention, the isolation transformer also amplifies the oscillator output voltage by a predetermined isolation stage voltage amplification factor.

The voltage amplifier 30 in the output stage 16 is preferably implemented using another capacitor ladder including capacitors C6, C7, C8 and diode rectifiers D6, D7, D8. The voltage amplification is dependent on the number of capacitors and diode rectifiers in the ladder, as well as their respective ratings.

The voltage regulator 34 is implemented with high voltage diode rectifiers. A number of rectification diodes can be used in series to provide a predetermined voltage limit that clamps the high voltage output at a predetermined maximum voltage limit. The amplified output voltage 32 is greater than the clamped voltage limit to keep the diodes in the voltage regulator 34 in conduction. A person skilled in the art will understand that the voltage clamp can be implemented in other ways besides the diode rectifiers, because other combinations of electrical components can be arranged to limit output voltages. The diode rectifiers provide a cost effective solution.

The fault limiting circuit 36 is implemented using a resistor R4. While in operation, the electrostatic air filter unit requires very little load current under normal concentrations of air contaminants. As a result, there is very little voltage drop across the terminals of resistor R4. The output 38 of the high voltage power supply 10 is substantially near the predetermined voltage limit imposed by the voltage regulator 34. During a ground fault, R4 throttles the high voltage drop, permitting a limited load current to pass through.

The bleeder circuit 40 is implemented, for example, using a high impedance resistor R3. During operation of the high voltage power supply 10, the bleeder circuit 40 draws very little current due to its high impedance. When input power 18 is removed from the high voltage power supply 10, electrostatic charges remain on the electrodes of the electrostatic air filter, and capacitors C6, C7 and C8 remain charged. When the input power 18 is removed, the electrostatic charges left on the electrodes, and the capacitors C6, C7 and C8 discharge through R3. The rate of discharge is dependent the amount of charge stored, and the value of impedance of resistor R3. The impedance of the fault limiting circuit 36 may also affect the rate of discharge of the stored charge on the electrodes.

The particular choice of impedance R1 used in implementing the operation indicator 24 also provides a discharge path for components of the input stage 12 when the input power 18 is removed from the high voltage power supply 10.

FIGS. 3a–3c respectively illustrate a top plan view, a side elevational view and a bottom plan view of an embodiment of the high voltage power supply in accordance with the invention. As described above, the high voltage power supply 10 is encased in a plastic resin 50. The high voltage output is a titanium electrode 38 having an insulated cover 52 and an exposed top. The input power (not shown) is connected to input power leads 18. The operational indicator 24 is, for example, a light emitting diode (LED). The ground wire 12 is preferably stripped bare for most of its length to ensure a good ground contact with a frame of the electrostatic air filter (not shown).

The high voltage power supply in accordance with the invention is therefore compact, light weight and substantially impervious to damage resulting from normal handling, exposure to water or water vapor, or exposure to air that is heavily contaminated with dust or conductive particles such as carbon fibers.

The embodiments of the invention described above are intended to be exemplary only. The scope of the invention is therefore intended to be limited solely by the scope of the appended claims.

We claim:

1. A power supply for an electrostatic air filtration unit, comprising:

an input stage that includes an oscillator driven by input power, the oscillator providing an oscillator output voltage;

an output stage that includes an output amplifier for outputting an amplified output voltage on an output electrode at an output of the power supply; and a voltage regulator for inhibiting the output voltage from exceeding a predetermined maximum voltage; and an isolation stage for de-coupling the input stage from the output stage.

2. A power supply as claimed in claim 1, wherein the power supply is encased in a resin to provide resistance to tampering and environmental damage.

3. A power supply as claimed in claim 1, wherein the output electrode comprises titanium.

4. A power supply as claimed in claim 1, wherein the input stage further comprises an input amplifier that outputs an amplified input voltage to the oscillator, a voltage of the input power being amplified by a predetermined input voltage amplification factor.

5. A power supply as claimed in claim 4, wherein the input amplifier includes a capacitor ladder.

6. A power supply as claimed in claim 1, wherein the isolation stage includes a high voltage isolation transformer.

7. A power supply as claimed in claim 6, wherein the high voltage isolation transformer amplifies the oscillator output voltage by a predetermined isolation stage voltage amplification factor.

8. A power supply as claimed in claim 1, wherein the voltage regulator comprises a voltage clamp.

9. A power supply as claimed in claim 8, wherein the voltage clamp is a diode.

10. A power supply as claimed in claim 1, the power supply further comprises means for bleeding off stored electrostatic charges accumulated on the surface of the output electrode when the power supply is switched off.

11. A power supply as claimed in claim 10, wherein the means for bleeding high voltage has a high impedance.

12. A power supply as claimed in claim 11, wherein the means for bleeding high voltage is a high impedance resistor.

13. A power supply as claimed in claim 1, wherein the power supply further comprises a fault limiting circuit to inhibit damage to the power supply induced by high current flows to the output electrode.

14. A power supply as claimed in claim 1, wherein the output voltage amplifier comprises a capacitor ladder.

15. A method of manufacturing a power supply for an electrostatic air filtration system, comprising steps of:

assembling an input stage that includes an oscillator driven by input power, the oscillator providing an oscillator output voltage;

assembling an output stage that includes an output amplifier for outputting an amplified output voltage on an output electrode at an output of the power supply; and a voltage regulator for inhibiting the output voltage from exceeding a predetermined maximum voltage; and interconnecting the input stage and the output stage using an isolation stage to electrically de-couple the input stage from the output stage.

16. The method as claimed in claim 15 further comprising a step of encasing the assembled power supply in an impermeable case in order to inhibit tampering an environmental damage to the power supply.

17. The method as claimed in claim 16 wherein the step of encasing comprises a step of encasing the power supply in a plastic resin that completely encapsulates the power supply.

18. The method as claimed in claim 15 wherein the step of interconnecting comprises a step of using an isolation transformer to interconnect the input stage and the output stage.

19. A power supply for an electrostatic air filtration unit, comprising:

an input stage that includes a voltage amplifier and an oscillator driven by input power, the oscillator providing an oscillator output voltage;

an output stage that includes an output amplifier for outputting an amplified output voltage on an output electrode at an output of the power supply, a voltage regulator for inhibiting the output voltage from exceeding a predetermined maximum voltage, and a fault limiting circuit for controlling a current drawn from the power supply; and an isolation transformer for de-coupling the input stage from the output stage.

20. A power supply as claimed in claim 19 wherein the power supply is encased in a plastic resin in order to inhibit tampering and environmental damage caused by the infiltration of water and dust particles.

* * * * *